(12) United States Patent  
Camp, II et al.

(10) Patent No.: US 8,319,104 B2  
(45) Date of Patent: Nov. 27, 2012

(54) SEPARATOR FOR COMMUNICATION CABLE WITH SHAPED ENDS

(75) Inventors: David P. Camp, II, Florence, KY (US); Scott M. Brown, Independence, KY (US); Robert D. Kenny, Cincinnati, OH (US)

(73) Assignee: General Cable Technologies Corporation, Highland Heights, KY (US)

( * ) Notice: Subject to any disclaimer, the term of this patent is extended or adjusted under 35 U.S.C. 154(b) by 247 days.

(21) Appl. No.: 12/704,957

(22) Filed: Feb. 12, 2010

(65) Prior Publication Data

US 2010/0200269 A1 Aug. 12, 2010

Related U.S. Application Data

(60) Provisional application No. 61/151,731, filed on Feb. 11, 2009.

(51) Int. Cl.
    *H01B 11/02* (2006.01)
(52) U.S. Cl. .................................. 174/113 C
(58) Field of Classification Search ............... 174/113 C
    See application file for complete search history.

(56) References Cited

U.S. PATENT DOCUMENTS

| | | |
|---|---|---|
| 483,285 A | 9/1892 | Guilleaume |
| 1,008,370 A | 11/1911 | Robillot |
| 1,780,533 A | 11/1930 | Oxer |
| 1,780,564 A | 11/1930 | Oxer |
| 1,883,268 A | 10/1932 | Yolles |
| 1,883,269 A | 10/1932 | Yonkers |
| 1,976,847 A | 10/1934 | Gordon et al. |
| 2,125,869 A | 8/1938 | Atkinson |
| 2,455,773 A | 12/1948 | Johnson |
| 2,538,019 A | 1/1951 | Lee |
| 2,847,499 A | 8/1958 | Peterson |
| 3,209,064 A | 9/1965 | Cutler |
| 3,644,659 A | 2/1972 | Campbell |
| 3,819,443 A | 6/1974 | Simons et al. |
| 3,848,073 A | 11/1974 | Simons et al. |
| 3,881,052 A | 4/1975 | Britz et al. |
| 3,911,200 A | 10/1975 | Simons et al. |
| 4,038,487 A | 7/1977 | Apen et al. |
| 4,041,237 A | 8/1977 | Stine et al. |
| 4,081,602 A | 3/1978 | Paniri et al. |
| 4,404,424 A | 9/1983 | King et al. |
| 4,550,559 A | 11/1985 | Thomson |
| 4,933,513 A | 6/1990 | Lee |
| 5,132,488 A | 7/1992 | Tessier et al. |

(Continued)

FOREIGN PATENT DOCUMENTS

EP 1 030 315 8/2000

(Continued)

*Primary Examiner* — Chau Nguyen  
(74) *Attorney, Agent, or Firm* — Blank Rome LLP

(57) ABSTRACT

A separator for a communication cable that comprises a body that includes at least first and second segments adapted to define a plurality of quadrants in the communication cable. The segments are substantially perpendicular to each other and define a junction point of the segments. Each of the segments includes a main portion and a terminal end remote from the junction point of the segments. Each of the terminal ends has a shape such that each of the terminal ends is wider than the main portions of the segments. At least one air pocket is defined between the terminal ends of the segments. The air pocket includes a gap sized such that the air pocket is substantially enclosed.

35 Claims, 8 Drawing Sheets

U.S. PATENT DOCUMENTS

| | | |
|---|---|---|
| 5,342,991 A | 8/1994 | Xu et al. |
| 5,399,813 A | 3/1995 | McNeill et al. |
| 5,574,250 A | 11/1996 | Hardie et al. |
| 5,742,002 A | 4/1998 | Arredondo et al. |
| 5,789,711 A | 8/1998 | Gaeris et al. |
| 5,821,466 A | 10/1998 | Clark et al. |
| 5,952,615 A | 9/1999 | Prudhon |
| 5,969,295 A | 10/1999 | Boucino et al. |
| 5,990,419 A | 11/1999 | Bogese, II |
| 6,066,799 A | 5/2000 | Nugent |
| 6,074,503 A | 6/2000 | Clark et al. |
| 6,099,345 A | 8/2000 | Milner et al. |
| 6,140,587 A | 10/2000 | Sackett |
| 6,150,612 A | 11/2000 | Grandy et al. |
| 6,162,992 A | 12/2000 | Clark et al. |
| 6,222,130 B1 | 4/2001 | Gareis et al. |
| 6,239,379 B1 | 5/2001 | Cotter et al. |
| 6,248,954 B1 | 6/2001 | Clark et al. |
| 6,310,295 B1 | 10/2001 | Despard |
| 6,342,678 B1 | 1/2002 | Knop et al. |
| 6,365,836 B1 | 4/2002 | Blouin et al. |
| 6,506,976 B1 | 1/2003 | Neveux, Jr. |
| 6,534,715 B1 | 3/2003 | Maunder et al. |
| 6,566,605 B1 | 5/2003 | Prudhon |
| 6,570,095 B2 | 5/2003 | Clark et al. |
| 6,596,944 B1 | 7/2003 | Clark et al. |
| 6,624,359 B2 | 9/2003 | Bahlmann et al. |
| 6,639,152 B2 | 10/2003 | Glew et al. |
| 6,687,437 B1 | 2/2004 | Starnes et al. |
| 6,743,983 B2 | 6/2004 | Wiekhorst et al. |
| 6,787,697 B2 | 9/2004 | Stipes et al. |
| 6,800,811 B1 | 10/2004 | Boucino |
| 6,812,408 B2 | 11/2004 | Clark et al. |
| 6,818,832 B2 | 11/2004 | Hopkinson et al. |
| 6,855,889 B2 | 2/2005 | Gareis |
| 6,888,070 B1 | 5/2005 | Prescott |
| 6,998,537 B2 | 2/2006 | Clark et al. |
| 7,064,277 B1 | 6/2006 | Lique et al. |
| 7,157,644 B2 | 1/2007 | Lique et al. |
| 7,173,189 B1 * | 2/2007 | Hazy et al. ............... 174/110 R |
| 7,179,999 B2 | 2/2007 | Clark et al. |
| 7,329,815 B2 | 2/2008 | Kenny et al. |
| 7,405,360 B2 * | 7/2008 | Clark et al. ............... 174/113 R |
| 7,763,805 B2 * | 7/2010 | Stutzman ................. 174/113 R |
| 2001/0001426 A1 | 5/2001 | Gareis et al. |
| 2002/0079126 A1 | 6/2002 | Valenzuela |
| 2003/0106704 A1 | 6/2003 | Isley et al. |
| 2003/0121695 A1 | 7/2003 | Wiebelhaus et al. |
| 2003/0132021 A1 | 7/2003 | Gareis |
| 2003/0159848 A1 | 8/2003 | Hopkinson et al. |
| 2003/0217863 A1 | 11/2003 | Clark et al. |
| 2004/0026113 A1 | 2/2004 | Bahlmann et al. |
| 2004/0035603 A1 | 2/2004 | Clark et al. |
| 2004/0055777 A1 | 3/2004 | Wiekhorst et al. |
| 2004/0055779 A1 | 3/2004 | Wiekhorst et al. |
| 2004/0055781 A1 | 3/2004 | Cornibert et al. |
| 2004/0118593 A1 | 6/2004 | Augustine et al. |
| 2004/0149483 A1 | 8/2004 | Glew |
| 2005/0023028 A1 | 2/2005 | Clark |
| 2005/0029007 A1 | 2/2005 | Nordin et al. |
| 2005/0092514 A1 | 5/2005 | Kenny et al. |
| 2005/0092515 A1 | 5/2005 | Kenny et al. |
| 2005/0103518 A1 | 5/2005 | Glew |
| 2005/0167149 A1 | 8/2005 | Prescott |
| 2005/0167151 A1 | 8/2005 | Kenny et al. |
| 2005/0199415 A1 | 9/2005 | Glew |
| 2005/0205289 A1 | 9/2005 | Kenny et al. |
| 2007/0044994 A1 | 3/2007 | Park et al. |
| 2007/0209825 A1 * | 9/2007 | Glew ....................... 174/113 R |
| 2008/0115958 A1 | 5/2008 | Stutzman et al. |

FOREIGN PATENT DOCUMENTS

| | | | |
|---|---|---|---|
| FR | 2818000 | * | 6/2002 |
| GB | 342606 | | 2/1931 |
| GB | 2120836 A | | 12/1983 |
| GB | 2 164 471 | | 3/1986 |
| WO | 99/30331 | | 6/1999 |

* cited by examiner

SEPARATOR FOR COMMUNICATION CABLE WITH SHAPED ENDS

RELATED APPLICATIONS

This application claims priority under 35 U.S.C. §119(e) to U.S. Provisional Application Ser. No. 61/151,731, filed on Feb. 11, 2009, the subject matter of which is hereby incorporated by reference in its entirety.

This application may be related to co-pending commonly assigned application Ser. No. 12/695,594, filed Jan. 28, 2010, the subject matter of which is hereby incorporated by reference in its entirety.

FIELD OF THE INVENTION

The present invention relates to a separator for a communication cable. More specifically, the separator of the present invention includes geometric or shaped ends for separating the wire pairs of the communication cable.

BACKGROUND OF THE INVENTION

Conventional communication cables, which typically transmit digital information, employ a plurality of twisted wire pairs. To satisfy high speed digital requirements, the communication cables must transmit communication at high frequencies, typically to 500 Mhz. However with high frequencies, interference or near end crosstalk occurs due to electromagnetic coupling between the twisted pairs within the cable. Such interference degrades the performance of the cable.

To reduce such interference and improve performance, the twisted pairs of the communication cable are often twisted with very short lay lengths and/or a filler is added to physically increase the distance between the pairs. Conventional communication cable fillers are very thick and often have a uniform shape to provide the necessary distance between the pairs to reduce interference. Alternatively, the twisted pairs of conventional communication cables are individually shielded from one another. All of these options, however, are costly, and often do not provide optimum flame performance and dielectric properties.

SUMMARY OF THE INVENTION

Accordingly, an exemplary embodiment of the present invention teaches a separator for a communication cable that comprises a body that includes at least first and second segments adapted to define a plurality of quadrants in the communication cable. The segments are substantially perpendicular to each other and define a junction point of the segments. Each of the segments includes a main portion and a terminal end remote from the junction point of the segments. Each of the terminal ends has a shape such that each of the terminal ends is wider than the main portions of the segments. At least one air pocket is defined between the terminal ends of the segments. The air pocket includes a gap sized such that the air pocket is substantially enclosed.

Another exemplary embodiment of the present invention teaches a communication cable that comprises a jacket, at least one twisted wire group supported by the jacket, and a separator received in the jacket. The separator includes a body that has at least first and second segments adapted to define a plurality of quadrants in the communication cable. The segments are substantially perpendicular to each other and define a junction point of the segments. Each of the segments includes a main portion and a terminal end remote from the junction point of the segments. Each of the terminal ends has a shape such that each of the terminal ends is wider than the main portions of the segments. At least one air pocket is defined between the terminal ends of the segments. The air pocket includes a gap sized such that the air pocket is substantially enclosed, whereby the at least one twisted wire group is prevented from entering the air pocket.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
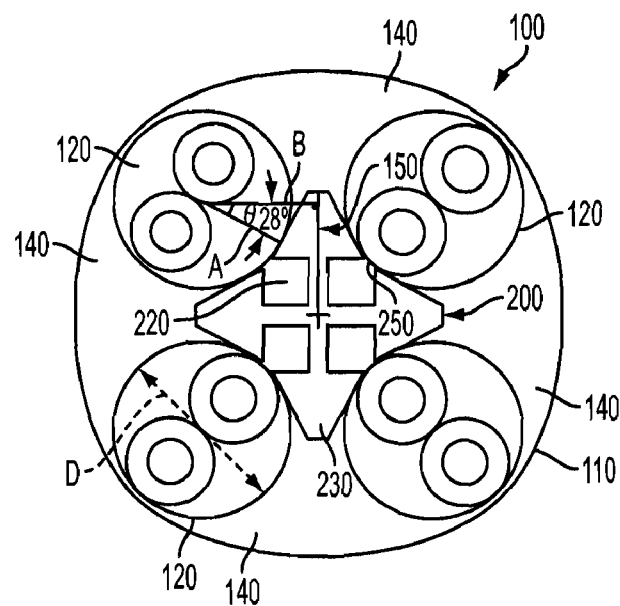
FIG. 1 is a cross sectional view of a communication cable including a separator according to an exemplary embodiment of the present invention.
Figure 2:
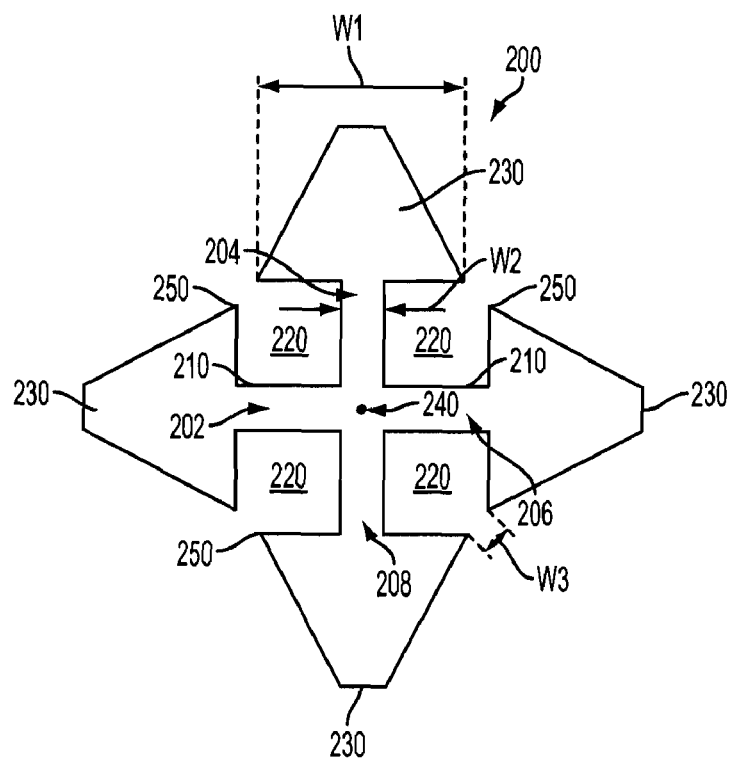
FIG. 2 is an enlarged cross sectional view of the separator illustrated in FIG. 1.

Referring to FIGS. 1-2, a cable 100 has a jacket 110 supporting a plurality of twisted wire pairs 120 and includes a separator 200 in accordance with the present invention. The separator 200 extends longitudinally within the cable 100 to separate the wire pairs 120. The separator 200, by introducing air pockets 220 created by shaped or geometric terminal ends 230 of the separator, reduces crosstalk interference between the pairs 120 while also improving the smoke/flame performance and the dielectric properties of the cable. The terminal ends 230 of the separator 200 preferably have a shape that push the wire pairs 120 away from the cable's center and away from each other to reduce interference between the wire pairs 120. For example, the separator's shaped ends 230 cause the wire pairs 120 to be positioned radially outwardly by about at least 0.003-0.010 inches more than if the shaped terminal ends were not employed. Moreover, the separator 200 and its shaped ends 230 achieve the desired pair-to-pair distance using less material than if the shaped ends were not used.

As seen in FIG. 2, the separator 200 is preferably a one-piece body that forms a cross-web with first, second, third and fourth segments 202, 204, 206, and 208. The segments 202, 204, 206, and 208 form generally four quadrants 140 (FIG. 1) within the cable 100 for holding the wire pairs. The separator may be located at the core of the cable within the cable's jacket, as seen in FIG. 1. The separator 200 may be, however, separate pieces attached together and may have any number of segments, including a single segment. Each segment 202, 204, 206, and 208 has a main portion 210 and a shaped terminal end 230 remote from the junction 240 of the segments. The terminal ends 230 space the wire pairs 120 radially outwardly to reduce interference between the pairs. As best seen in FIG. 1, it is preferable that the length of the individual segments 202, 204, 206, and 208 does not extend radially outwardly beyond the wire pairs. That is, it is preferable that the separator 200 does not extend radially outwardly beyond the diameter D of the wire pairs.

The width W1 of each shaped terminal end 230 is larger than the width W2 of the main portion 210 of the segments, as seen in FIG. 2. It is preferable that the width W1 of the terminal ends 230 tapers outwardly going toward the center of the cable or the junction 240 of the segments such that the width W1 increases towards the junction 240. The outward taper provides optimum positioning for individual wire pairs 120. As seen in FIG. 1, it is preferable that the shape or taper of the shaped ends 230 define an angle θ between a line A (extending from the center of an individual wire pair to a point of contact between that wire pair and an adjacent shaped terminal end) and a line B (perpendicular to a central plane 150 of the segment with that terminal end). In one preferred embodiment, angle θ is about 15 to 35 degrees, and preferably 28 degrees, for optimum wire pair positioning.

Each shaped terminal end 230 preferably has a substantially triangular cross-sectional shape, as seen in FIG. 2. The shaped terminal ends 230 may have any cross-sectional shape, however, including circular, square, diamond, and the like. The shaped terminal ends 230 preferably have a tensile and linear strength that is greater than the main portions 210 of the segments 202, 204, 206, and 208.

The shaped terminal end 230 of the segments 202, 204, 206, and 208 define air pockets 220 located between the ends 230 and the main portions 210 of the segments. The air pockets contain air and are thus empty, as seen in FIGS. 1 and 2. Each air pocket 220 includes a gap 250 between two of the shaped terminal ends 230, as seen in FIG. 2. Each gap 250 may have a width W3 that is smaller than the diameter D (FIG. 1) of the individual wire pairs 120. It is preferable that the width W3 of the gaps 250 be sufficiently smaller than the diameter D of the wire pairs 120 so as to prevent the wire pairs 120 from entering the air pockets 220. In one preferred embodiment, the width W3 of the gaps 250 is small enough that the air pockets 220 are substantially enclosed. The air pockets 220 formed by the terminal ends 230 preferably have a square cross-sectional shape. However, the air pockets 220 may have any shape as dictated by the shape of the terminal ends 230.

The air pockets 220 represent the reduction of material needed in the separator to sufficiently space the wire pairs 120 to reduce interference. The reduction in material reduces manufacturing costs and reduces the amount of combustible material, thereby improving the smoke and flame performance of the cable 100. A cable having a similar construction to the cable of the present invention, differing only in the weight of the flouropolymer separator, were tested to NFPA 262 Standard Method of Test for Flame Travel and Smoke of Wire and Cables for use in air handling spaces to determine the optical density of the smoke thickness generated from the cable burned. The cable, with a separator weight of 4.2 pounds per thousand feet, had measurements of 0.89 and 0.85 for peak optical density and an average optical density of 0.198 and 0.192. The cable, with a separator weight of 2.4 pounds per thousand feet, had measurements of 0.34 and 0.44 for peak optical density and 0.12 and 0.13 for average optical density. Also, the air pockets 220 introduce more air into the cable 100, thereby improving the cable's dielectric properties.

The separator 200 may be formed of melt processable materials, such as fluoroploymers, polyvinylchorides, polyolefins, polyethylenes, or the like. The separator 200 may also be formed at least in part by non-processable materials, such as PTFE, rubber, glass, silicone, or the like.

Figure 3:
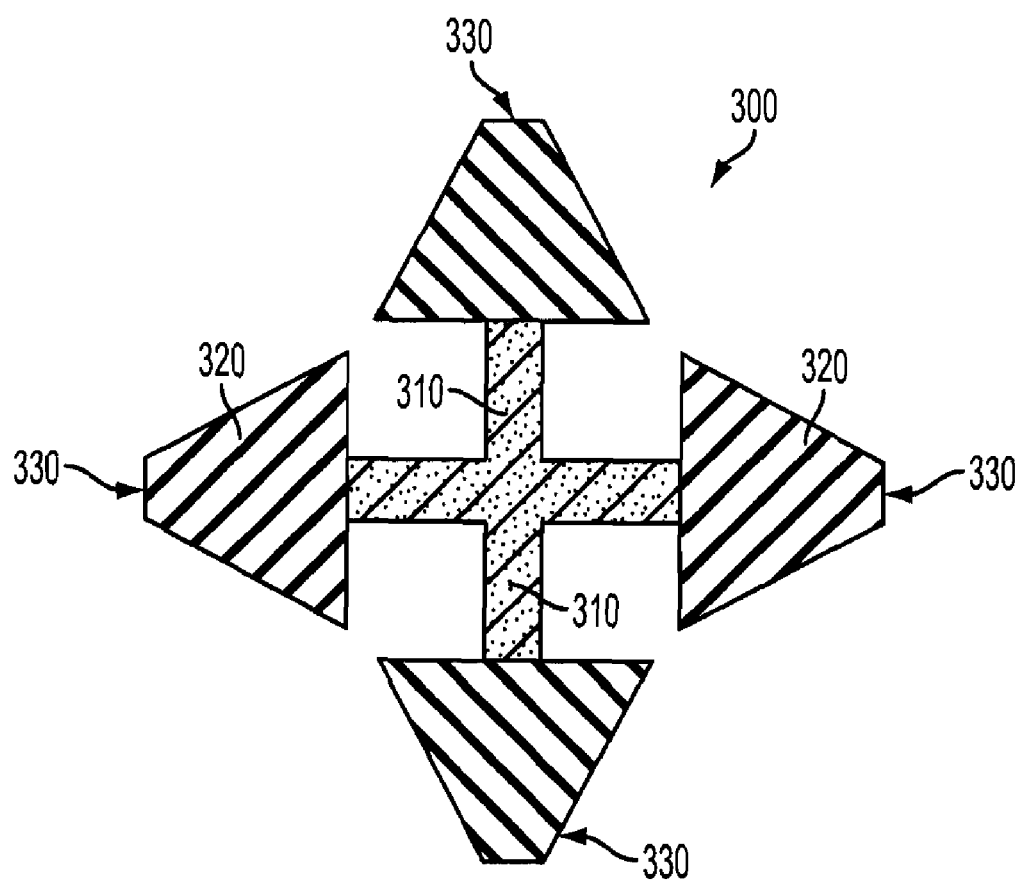
FIG. 3 is an enlarged cross-sectional view of a separator according to an another embodiment of the invention, showing the separator formed of both solid and foam materials.

Additionally, the separator 200 may be formed of a combination of air and melt processable materials, such as is achieved with foaming. For example, as seen in FIG. 3, a separator 300 according to another embodiment may have at least one region 310 that is a foam material and at least one region 320 that is a solid material. The solid region 320 is more compression resistant than the foam region 310 and thereby provides some rigidity to the separator. The foam material of the foam region 310 optimizes flame, smoke, and dielectric properties of the separator and is less expensive than forming the entire separator of solid material. Although FIG. 3 shows the shaped ends 330 of the separator 300 being the solid region 320 and the main portions of the segments being the foam region 310, the ends 330 may instead be foam and the main portions solid. Furthermore, the ends 330 and/or the main portions may have both foam and solid regions.

Figure 4A:
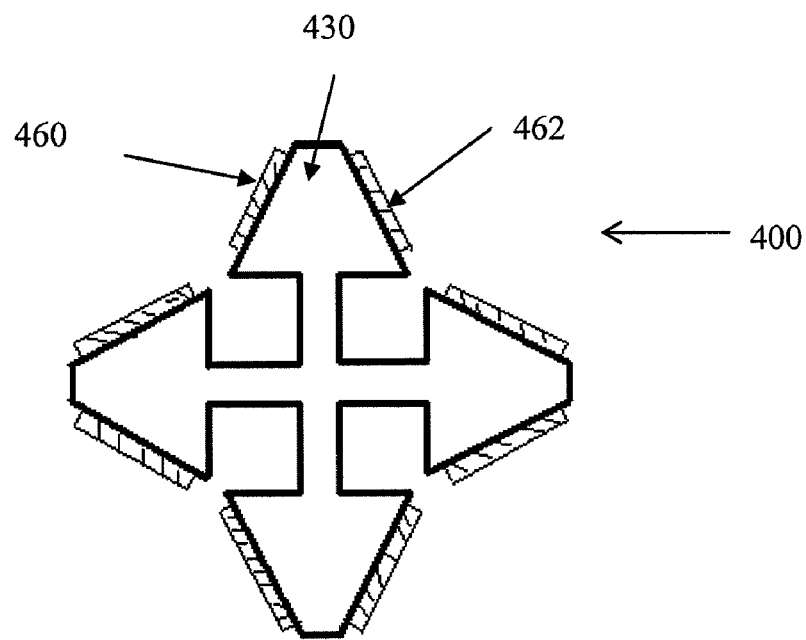
FIGS. 4A-4B are enlarged cross-sectional views of a separator according to yet another embodiment of the invention, showing the separator with added conductive layers.
Figure 4B:
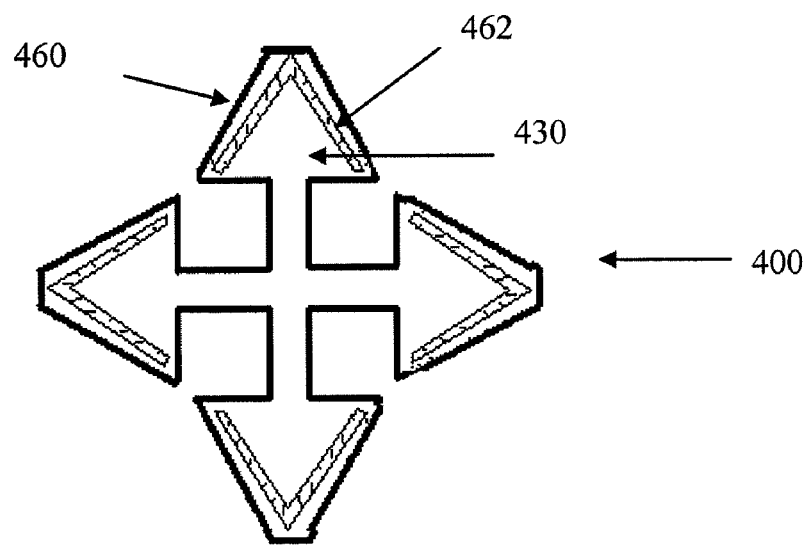
Figure 4C:
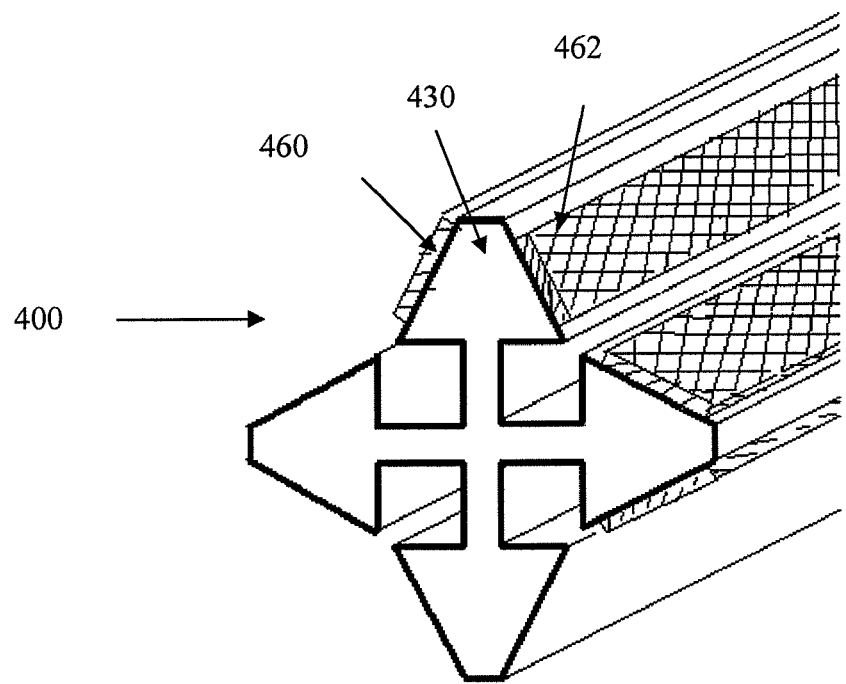
FIGS. 4C-4D are enlarged perspective end views of the separator illustrated in FIGS. 4A-4B.
Figure 4D:
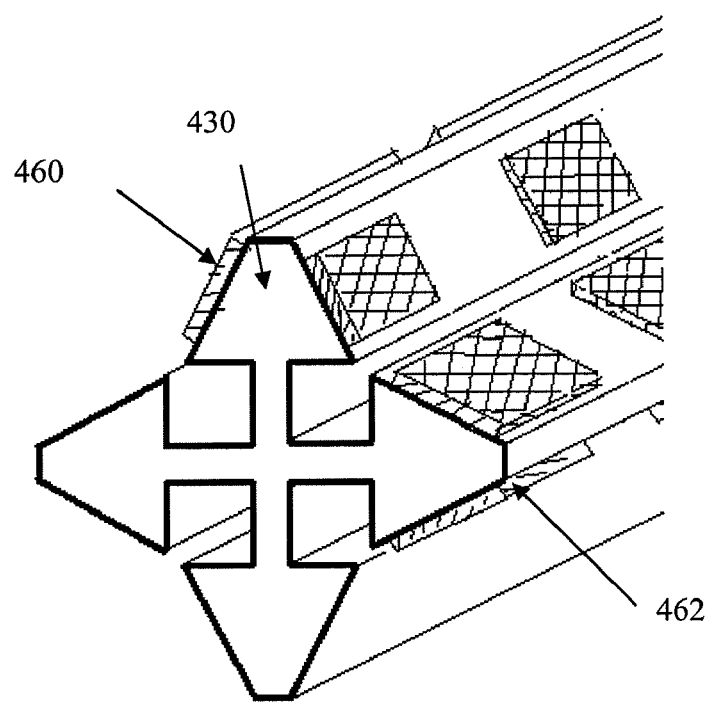

As seen in FIGS. 4A-4D, a conductive layer may be added to the separator. The conductive layer further reduces crosstalk interference by creating a barrier to the electromagnetic coupling between wire pairs. For example, a separator 400 of FIG. 4A according to another exemplary embodiment of the present invention, includes conductive layers 460 and 462 disposed on the outer surfaces of the separator's shaped ends 430. Alternatively, the conductive layers 460 and 462 may be embedded in the terminals ends 430, as seen in FIG. 4B. Also, the conductive layers 460 and 462 may be applied to the separator's shaped ends 430 in a continuous layer, as seen in FIG. 4C, or as a spaced segments, that may be the same or different sizes, as seen in FIG. 4D. The use of spaced segments reduces the emission of electromagnetic noise from the conductive layer or layers and also reduces the susceptibility of the conductive layer or layers to radiated electromagnetic energy from the wire pairs or external sources to the cable.

Figure 5A:
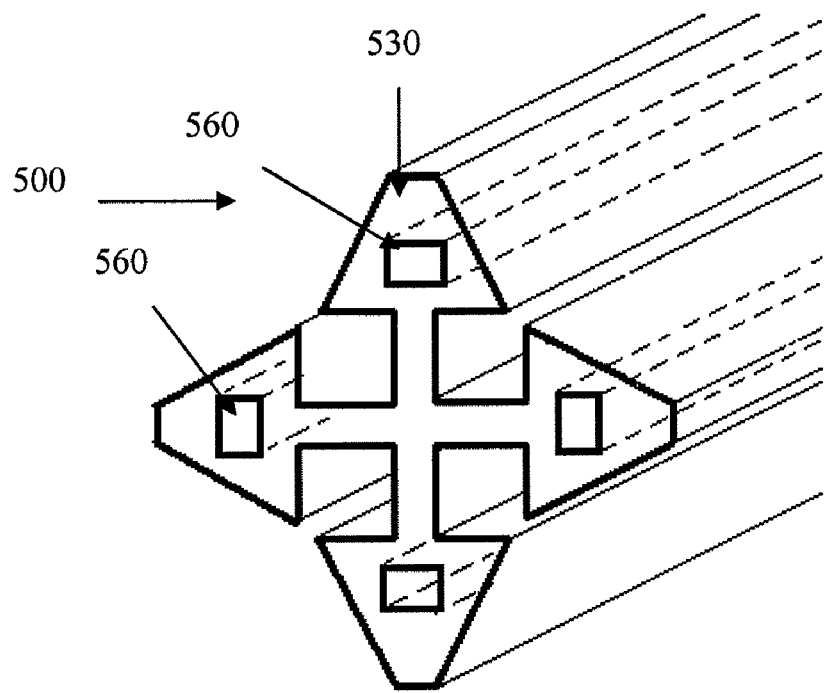
FIGS. 5A-5B are enlarged perspective end views of a separator according to still another embodiment of the invention, showing the separator with linear channels.
Figure 5B:
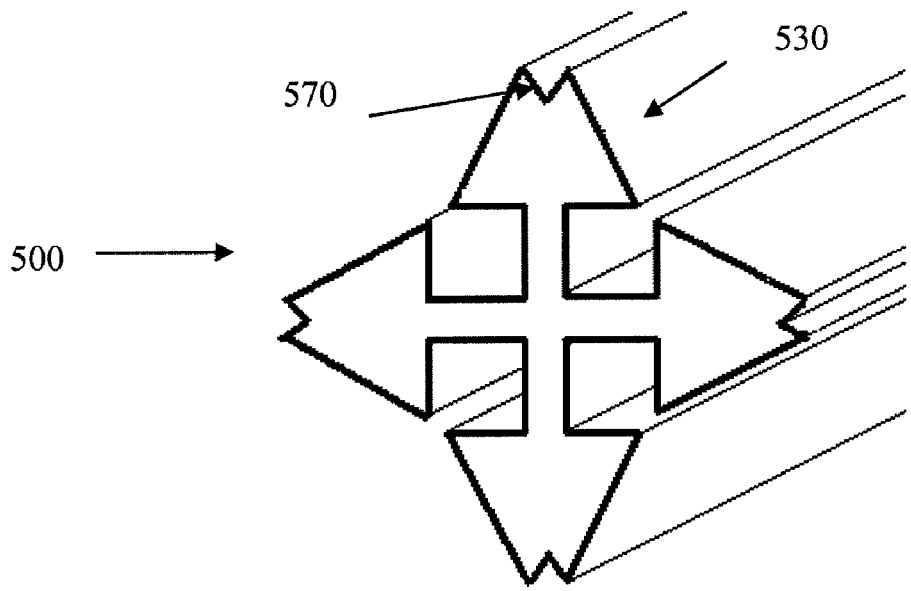

In yet another exemplary embodiment of the present invention, the separator's shaped terminal ends may have regions of discontinuity, such as dents, dimples, linear channels, or the like, to further reduce the cross-sectional area of the separator, thus reducing the volume of material used in the separator. For example, as seen in FIG. 5A, a separator 500 includes linear channels 560 extending longitudinally through generally the center of the shaped ends 530. Although the channels 560 are illustrated as having a substantially square cross-sectional shape, the channels 560 may have any cross sectional shape, such as rectangular, diamond, triangular, circular and the like. As seen in FIG. 5B, linear channels 570 may also be provided on the outer surface of the shaped ends 530. The channels 570 may have any shape, such as a substantially V cross-sectional shape, as seen in FIG. 5B, or other shapes, such as a U cross-sectional shape or the like.

Figure 6:
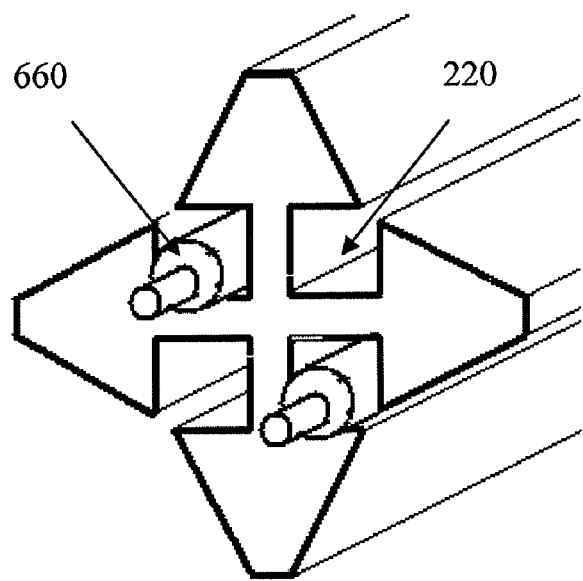
FIG. 6 is an enlarged perspective view of a separator according to yet another embodiment of the present invention, showing fiber optic filaments disposed in air pockets of the separator.

In still another exemplary embodiment of the present invention, additional filaments may be employed in the cable 100. For example, as seen in FIG. 6, one or more fiber glass filaments 660 for carrying an optical fiber signal may be placed in one or more of the air pockets 220 of the separator.

Figure 7A:
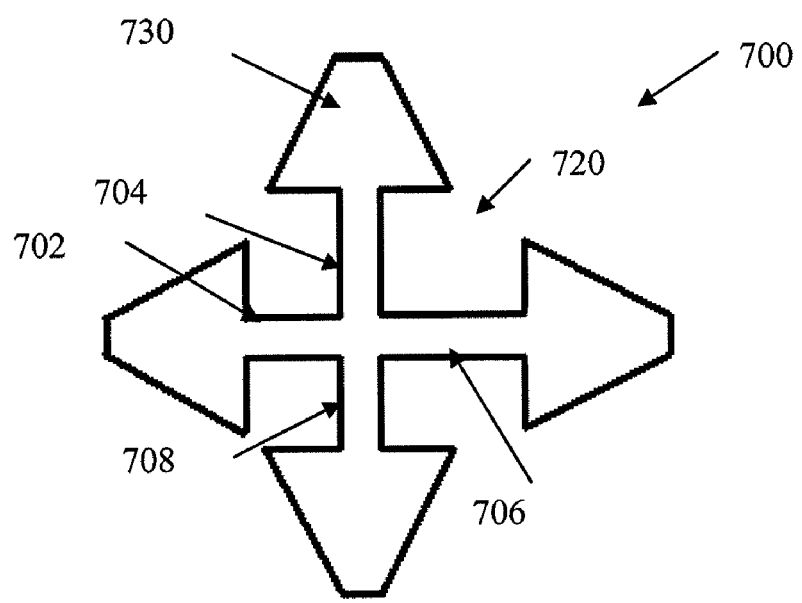
FIGS. 7A-7D are enlarged cross-sectional views of further embodiments of a separator according to the present invention, showing an extension added to the separator.

FIGS. 7A-7D illustrate further alternative configurations of the separator according to another exemplary embodiment of the present invention. FIG. 7A shows a separator 700 that may have one or more segments, such as segment 706, that is longer than the remaining segments 702, 704, and 708, such that the shaped end 730 of the elongated segment 706 extends outwardly further than the remaining ends. In this embodiment, the separator pushes one or more wire pairs further apart. That construction allows for further mitigation of crosstalk interference between specific wire pairs, particularly within a cable that may be more susceptible to electromagnetic coupling due to the twist ratios of the pairs.

Figure 7B:
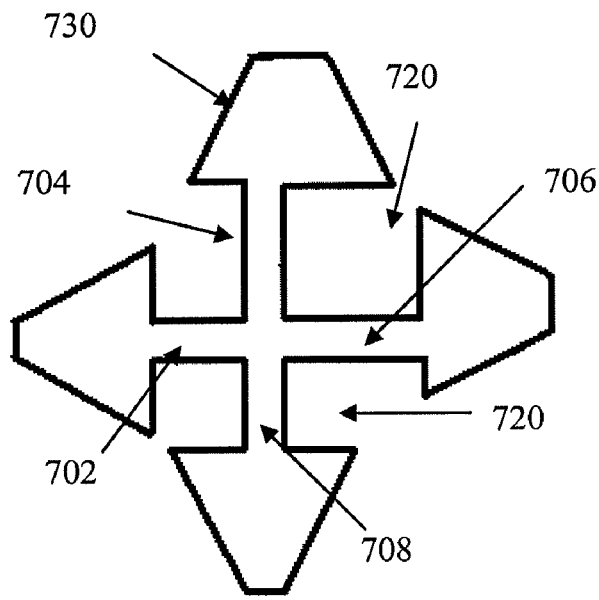
Figure 7C:
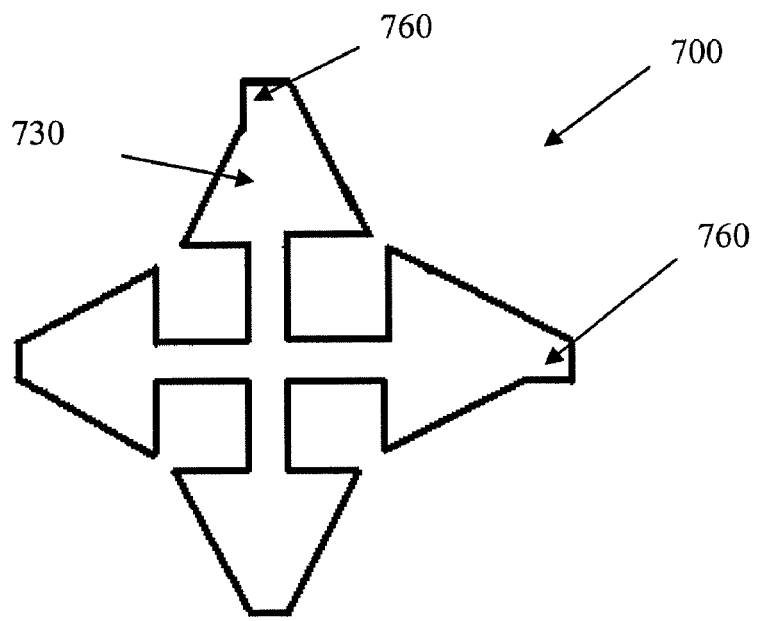
Figure 7D:
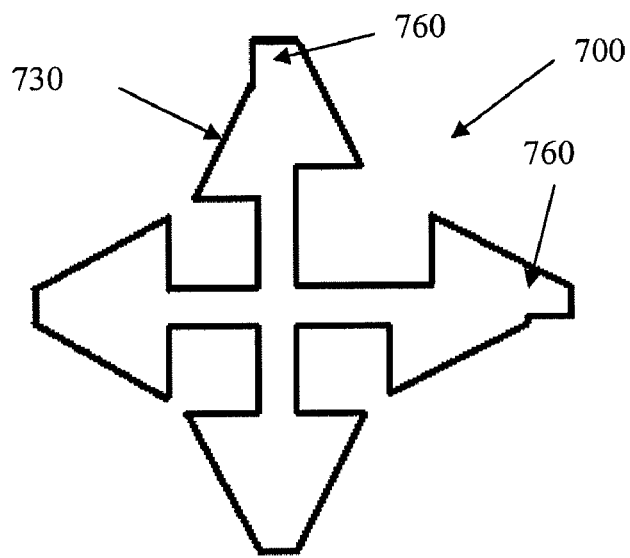

Also, FIG. 7B shows that the separator's shaped ends 730 may be offset at the terminals ends of the segments 702, 704, 706, and 708. Moreover, due to the elongated segment 706, the air pockets 720 defined between the ends of the separator (shown in FIGS. 7A and 7B) have different sizes with some air pockets 720 being larger or smaller than others. The offset configuration of the ends 730, as shown in FIG. 7B, also varies the size and shape of the air pockets 720. Additionally, as seen in FIGS. 7C-7D, the separator 700 may include extensions 760 added to at least one of the shaped ends 730. Such a configuration gives that shaped end a non-uniform shape that extends the end outwardly further than the ends without the extension 760. The extensions 760 act to push the wire pairs further apart to further reduce crosstalk.

Figure 8:
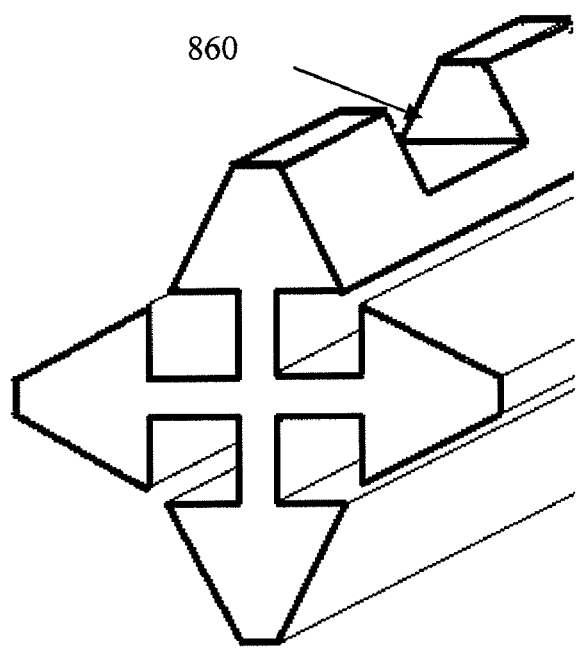
FIG. 8 is an enlarged perspective end view of a separator according to still yet another embodiment of the present invention, showing the ends of the separator as having discontinuous sections.

While particular embodiments have been chosen to illustrate the invention, it will be understood by those skilled in the art that various changes and modifications can be made therein without departing from the scope of the invention as defined in the appended claims. For example, as seen in FIG. 8, the terminal ends of the separator of any of the above embodiments may include discontinuous sections 860 to reduce material use. Additionally, although the twisted wire pairs 120 are shown as two wires twisted together, the twisted wires may be any number of wires, twisted together as a group.

What is claimed is:

1. A separator for a communication cable, comprising:
a body including,
at least first and second segments adapted to define a plurality of quadrants in the communication cable, said at least first and second segments being substantially perpendicular to each other and defining a junction point of said at least first and second segments,
each of said at least first and second segments including a main portion and a terminal end remote from said junction point of said segments, and each of said terminal ends having a shape such that each of said terminal ends is wider than said main portions of said segments, and
at least one air pocket defined between said terminal ends of said at least first and second segments, said air pocket including a gap sized such that said air pocket is substantially enclosed, said air pocket being empty.

2. A separator according to claim 1, wherein said width of each of said terminal ends increases toward said junction point of said segments.

3. A separator according to claim 1, wherein each of said terminal ends has a generally triangular cross-sectional shape.

4. A separator according to claim 1, wherein said air pocket has a generally square cross-sectional shape.

5. A separator according to claim 1, wherein said terminal ends include at least one conductive layer.

6. A separator according to claim 5, wherein said conductive layer is disposed on an outer surface of each of said terminal ends.

7. A separator according to claim 5, wherein said conductive layer is embedded in each of said terminal ends.

8. A separator according to claim 1, wherein said body includes at least one region formed of foam material and at least one region formed of solid material.

9. A separator according to claim 1, wherein at least one of said terminal ends includes a linear channel.

10. A separator according to claim 9, wherein said linear channel extends through substantially the center of said terminal end.

11. A separator according to claim 9, wherein said linear channel is disposed in an outer surface of said terminal end.

12. A separator according to claim 1, wherein said segments form a cross web, thereby defining at least four quadrants in the communication cable.

13. A separator according to claim 12, wherein said cross-web includes at least one region formed of a foam material and at least one region formed of a solid material.

14. A communication cable, comprising:
a jacket;
at least one twisted wire group supported by said jacket; and
a single separator received in a core of said jacket, said separator including,
a body having at least first and second segments adapted to define a plurality of quadrants in the communication cable, said at least first and second segments being substantially perpendicular to each other and defining a junction point of said at least first and second segments,
each of said at least first and second segments including a main portion and a terminal end remote from said junction point of said segments, each of said terminal ends having a shape such that each of said terminal ends is wider than said main portions of said segments, and an angle between a line extending from the center of said at least one wire group to a point of contact between said wire group and one of said terminal ends and a line perpendicular to a central plane of said segment with said one terminal end is about 15 to 35 degrees, and
at least one air pocket defined between said terminal ends of said at least first and second segments, said air pocket including a gap sized such that said air pocket is substantially enclosed,
whereby said at least one twisted wire group is prevented from entering said air pocket.

15. A communication cable according to claim 14, wherein said first and second of segments form a cross web, thereby defining at least four quadrants in the communication cable.

16. A communication cable according to claim 14, wherein said width of each of said terminal ends increases toward said junction point of said segments.

17. A communication cable according to claim 14, wherein each of said terminal ends has a generally triangular cross-sectional shape.

18. A communication cable according to claim 14, wherein said air pocket has a generally square cross-sectional shape.

19. A communication cable according to claim 14, further comprising
a plurality of air pockets defined between said terminal ends of said at least first and second segments, each of said plurality of air pockets including a gap; and
each of said gaps have a width substantially smaller than the diameter of said wire group thereby preventing said wire group from entering said air pockets.

20. A separator according to claim 14, wherein
said terminal ends include at least one conductive layer.

21. A separator according to claim 20, wherein
said conductive layer is disposed on an outer surface of each of said terminal ends.

22. A separator according to claim 20, wherein
said conductive layer is embedded in each of said terminal ends.

23. A communication cable according to claim 14, wherein
said twisted wire group is in direct contact with at least one of said terminal ends.

24. A separator according to claim 14, wherein
at least one of said terminal ends includes a linear channel.

25. A separator according to claim 24, wherein
said linear channel extends through substantially the center of said terminal end.

26. A separator according to claim 24, wherein
said linear channel is disposed in an outer surface of said terminal end.

27. A communication cable according to claim 14, wherein
said separator is formed of one or more melt processable materials.

28. A communication cable according to claim 14, wherein
said separator includes at least one non-processable material.

29. A communication cable according to claim 14, wherein
said separator includes at least one region formed of foam material and at least one region formed of solid material.

30. A communication cable according to claim 14, wherein
the tensile strength of each of said terminals ends is greater than the tensile strength of said main portions of said segments.

31. A communication cable according to claim 14, wherein
the linear strength of each of said terminal ends is greater than the linear strength of said main portions of said segments.

32. A communication cable according to claim 14, wherein
said air pocket includes an optical fiber.

33. A communication cable according to claim 14, wherein
no portion of said separator extends beyond the diameter of said wire group.

34. A communication cable according to claim 14, wherein
said body of said separator is a one-piece member.

35. A communication cable, comprising:
a jacket;
at least one twisted wire group supported by said jacket; and
a separator received in said jacket, said separator including,
a body having at least first and second segments adapted to define a plurality of quadrants in the communication cable, said at least first and second segments being substantially perpendicular to each other and defining a junction point of said at least first and second segments,
each of said at least first and second segments including a main portion and a terminal end remote from said junction point of said segments, and each of said terminal ends having a shape such that each of said terminal ends is wider than said main portions of said segments, and an angle between a line extending from the center of said at least one wire group to a point of contact between said wire group and one of said terminal ends and a line perpendicular to a central plane of said segment with said one terminal end is about 15 to 35 degrees, and
at least one air pocket defined between said terminal ends of said at least first and second segments, said air pocket including a gap sized such that said air pocket is substantially enclosed,
whereby said at least one twisted wire group is prevented from entering said air pocket.

* * * * *